No. 654,035. Patented July 17, 1900.
W. THOMSON.
ACCOUNT BOOK.
(Application filed Jan. 16, 1900.)

(No Model.) 2 Sheets—Sheet 1.

Inventor
Walter Thomson
per
Hubert E. Bok
Attorney

Witnesses
Geo. E. Drech.
B. E. Seitz

No. 654,035.
W. THOMSON.
ACCOUNT BOOK.
(Application filed Jan. 16, 1900.)
Patented July 17, 1900.
(No Model.)
2 Sheets—Sheet 2.
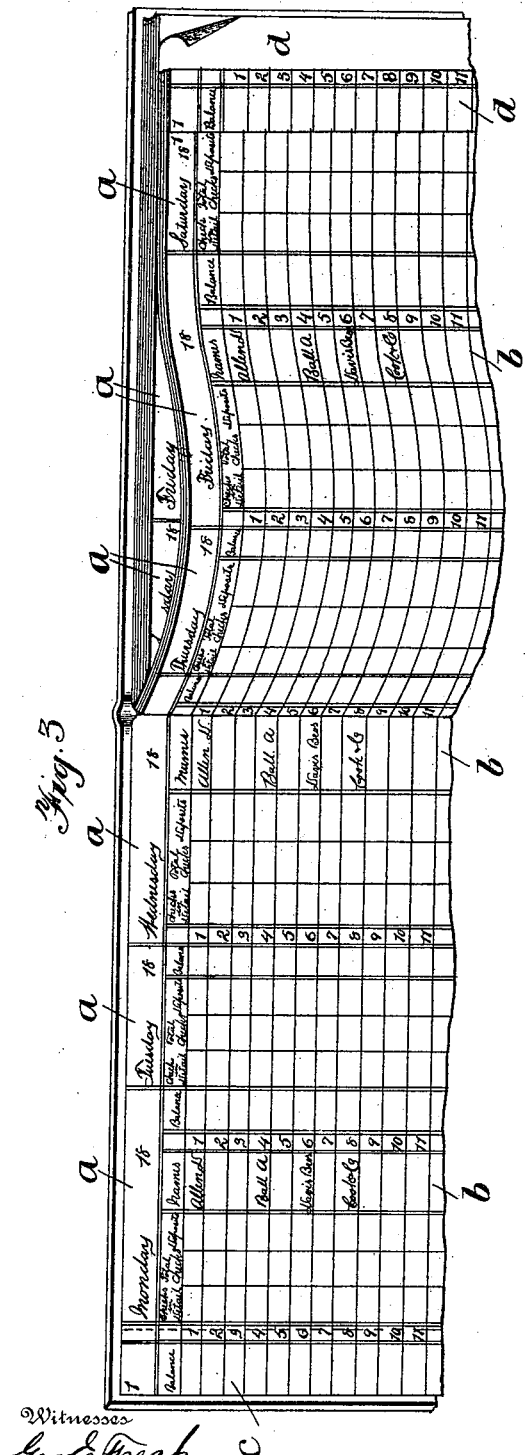
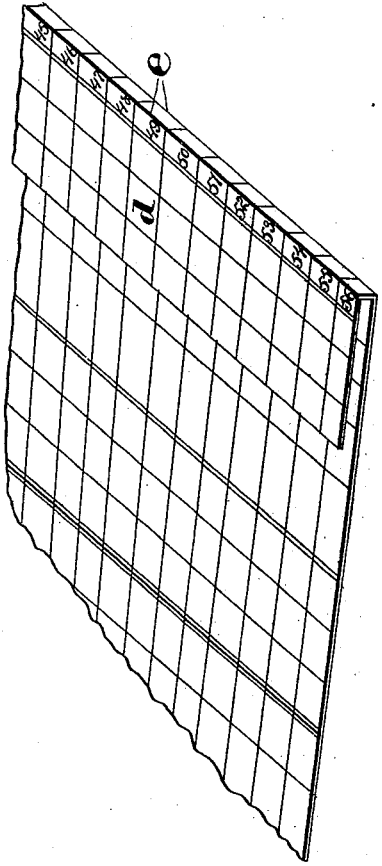
Witnesses
Geo. E. Frech.
B. E. Seitz
Inventor
Walter Thomson
per Hubert V. Beck
Attorney

UNITED STATES PATENT OFFICE.

WALTER THOMSON, OF ALBANY, NEW YORK, ASSIGNOR TO GEORGE C. HAWLEY, OF SAME PLACE.

ACCOUNT-BOOK.

SPECIFICATION forming part of Letters Patent No. 654,035, dated July 17, 1900.

Application filed January 16, 1900. Serial No. 1,621. (No model.)

*To all whom it may concern:*

Be it known that I, WALTER THOMSON, a citizen of the United States, residing at Albany, in the county of Albany and State of New York, have invented certain new and useful Improvements in Account-Books; and I do hereby declare the following to be a full, clear, and exact description of the invention, such as will enable others skilled in the art to which it appertains to make and use the same.

This invention relates to certain improvements in account-books or ledgers, and more particularly to improvements in and relating to that class of such books wherein the various accounts are carried forward or the balances are transferred from period to period—as, for instance, is necessary in depositors' balance bank-ledgers; and the objects and nature of my invention will be obvious to those skilled in the art in the light of the following explanation, reference being had to the accompanying drawings, which, however, merely illustrate an arrangement and a construction as an example for the purposes of illustration and explanation from among various other constructions and arrangements within the spirit and scope of my invention.

My invention consists in certain novel features in construction and in arrangements of parts and details and in combinations of elements, as more fully and particularly pointed out and described hereinafter.

Referring to the accompanying drawings, Figure 1 is a perspective view of an opened bank-ledger constructed and arranged in accordance with my invention, the book being shown opened at the first series of accounts. Said series of accounts progress from left to right across the said left and right hand pages, which are both numbered 1. Fig. 2 is a perspective view of a book or ledger constructed in accordance with my invention and partially broken away, the book being opened and several leaves partially turned to show different sets of accounts from those disclosed in Fig. 1. Fig. 3 is a perspective view of the ledger, showing the arrangement of the parts and the method followed in transferring the balances or carrying forward the accounts, say, from the first two pages 1 1 to the second set of pages 1 1, below or in front of the pages occupied by the other series of accounts in the ledger. Fig. 4 is a detail perspective, enlarged, showing the margin folded to the left to receive the ends of the leaves of the ledger intervening between the pages from and to which the balances are to be transferred.

In that class of account-books wherein the titles of the various accounts are arranged one under the other adjacent to the left-hand margin of the left-hand page when the book is open and the remainder of the left-hand page and the right-hand page are ruled in columns, so that the various accounts can progress or be carried forward from day to day or from period to period from left to right across said two pages, it is desirable to provide some practical simple means whereby the accounts or the balances can be carried forward or transferred from the extreme right-hand margin of said right-hand page to the left-hand margin or some succeeding double page similarly ruled. It is desirable that such means be provided whereby the balances can be transferred from page to page with facility and accuracy and without requiring the laborious and uncertain method of recopying the balances one by one from the completed page to the new page. Various constructions are now employed for this purpose in the class of books hereinbefore named, but my present invention involves certain marked differences and advantages over these old methods and constructions. For instance, in the Reissue Letters Patent No. 10,977, issued to me December 25, 1888, one of the said constructions now in general use is illustrated. In this patent I show a book having a series of full-sized leaves provided with the titles of the various accounts and series of short leaves interposed between the long leaves. Each set of accounts progresses across its full-sized leaf and then successively across the succeeding short leaves. One object of this patented invention was to obviate the necessity of rewriting the titles of the accounts on each succeeding page which received the same, and each short leaf was formed with a margin arranged to fold to the left, so that when the margin was folded to the left on its leaf the balance could be transferred from the page on one side of the leaf to the page on the other side of the same leaf. Thus in my said patented construction the accounts progress successively from the right side of each short leaf to the left side of the same leaf, and so on through the short leaves without interruption. Another form of ledger for this purpose is illustrated by Letters Patent No. 444,583, issued to me January 13, 1891. In the ledger of this patent the leaves are all full size and the same set of names or account-titles are recorded one below the other at the left-hand margin of each and every double page throughout the book, so that one set or series of accounts progresses uninterruptedly through the book from the first to the last page thereof. Each leaf of said last-mentioned ledger has a balance-column ruled at the left margin of each left-hand page when the book is open, and the names or account-titles are located in a column immediately to the right of said balance-column. The opposite side of each leaf is blank behind the said balance-column and the column occupied by the account-titles, and the margin having the said balance-column on one side thereof is arranged to fold to the left—that is, each leaf is formed to fold back on itself at its right-hand margin—so that the balances can be transferred from one page of a leaf to the opposite page of the same leaf. The blank portion of each leaf is twice the width of the margin which folds back.

An object of my present invention is to provide transferring means in a ledger composed of full-sized leaves particularly adapted to receive a large number of separate accounts—that is, a list of accounts composed of too many individual titles to permit recording thereof on any one page of the book, and hence wherein a number of the account-titles can be recorded one under the other on the first double page of the book and the remainder on the second double page or on as many more succeeding double pages as are necessary to accommodate the full list of account-titles. Thus, for example, if the first six double pages are required initially to accommodate the full list of account-titles the titles on the first double page will be duplicated on the seventh double page, and again on the thirteenth page, and so on at fixed intervals throughout the book. The second set of account-titles, found on the second page, will be duplicated on the eighth page, and again on the fourteenth page, and so on at the same intervals through the book. The full list of titles are thus successfully duplicated throughout the book in the same order and arranged on the pages in the same sets or series as followed in the initial list found on the first pages of the book—that is, in the instance above given, the initial six double pages will be found duplicated successively throughout the book in the same order, so far as the sets of names or titles are concerned.

It is a further object of the invention to provide simple and effective means whereby the accounts can be carried forward or the balances transferred with accuracy and rapidity from any set or series of accounts to the corresponding pages on which the same account-titles are recorded at some advanced portion of the book beyond the intervening pages containing the remaining series or sets of accounts going to make up the full list recorded in the book.

In carrying out these and other objects of my invention I usually construct the book in any suitable or desirable manner with leaves of equal size, preferably all full-sized, and all of approximately the same length and width as the book-covers. Each page is ruled vertically to form suitable columns according to the particular class of accounts for which the particular book is intended. For instance, in a bank-depositors' balance-ledger each page is ruled to form vertical succeeding columns or spaces $a$, (in the accompanying drawings,) indicated by the days of the week, printed or otherwise filled in at the upper ends of said spaces or columns, together with the date and year, as shown in said drawings. Each period space or column $a$ is subdivided by vertical rulings into various columns to receive the various items and record the business of each day relating to each account. In the drawings I show each period-space $a$ provided with a series of columns having top headings "Checks in detail," "Total checks," "Deposits," and "Balance." Those skilled in the art will readily understand the method of bookkeeping employed in said ledger, and that in each period or day column the charges—viz., checks—and the credits—viz., deposits—are entered in their respective columns, and the balance for the day is entered in the balance-column. The charges, credits, and balance of each account for any day can thus be determined at a glance, and all are recorded, and the accounts and balances of all depositors can thus be readily kept up to date.

The rulings and headings of the pages are so arranged that the pages are used in pairs—that is, a double page is occupied by each set of accounts as the book lies open. The accounts of said set progress from the left margin of the left-hand page toward the right across said left-hand page and then across the right page, and the balances are transferred from the right margin of the right-hand page to the left margin of what corresponds to the left-hand page of some similar double page at some advanced portion of the book, skipping the intervening leaves containing the other sets of accounts making up the complete list of the accounts contained in the book.

In addition to the debit, credit, and balance columns each page is ruled to form one or more vertical columns $b$ at convenient location or locations to receive the names or title of the accounts. The titles of the accounts are written, printed, or otherwise recorded, one under the other in vertical rows in said columns, and the same set of titles is arranged or recorded in all of the said columns of each double page, where more than one such column $b$ is employed and also throughout the corresponding double pages receiving the same set of accounts and distributed at fixed intervals in the book. In the drawings I show each double page provided with several columns for the names, arranged, respectively, at the end and central portions thereof. For instance, I show name-columns interposed in the "Monday," "Wednesday," and "Friday" spaces. I also show the pages (both left and right-hand pages) ruled horizontally to form parallel spaces in which the respective accounts progress and in which they are respectively confined, and I also show said horizontal lines successively numbered from top to bottom of each page. I preferably locate the identifying-numerals or other marks in vertical rows near the respective balance-columns to aid in locating each balance in its proper horizontal space, and thus aid in preventing the common error of placing balances or other entries in the wrong horizontal space belonging to some other account. I reduce the possibility of such errors by providing these indicating-marks for the respective horizontal account-spaces, and also by providing several columns of names properly distributed on each double page, so that if the bookkeeper is entering items—for instance, in the account of "Davis Bros."—he can observe that said account occupies the horizontal space across the double page, including lines 5 and 6, and thus follow said identifying-numerals in making entries. This method of identifying the horizontal account-spaces in connection with a name-column near the right-hand end of the right-hand page is of particular advantage in transferring balances to a clean double page. However my invention is not limited to the employment or arrangement of one or more name-columns on each page, nor to the employment of more than one name-column to a double page, nor to the employment of said identifying means for the horizontal account-spaces.

Each double page, as the book lies open, commences at the left margin of the left-hand page with a balance-column $c$, which receives the balance from the last period or day of some preceding page or from some other ledger, if such double page is the initial double page of the book for the particular list of accounts thereon. As hereinbefore explained, the accounts progress from this initial balance-column toward the right across the double page. The final ("Saturday") period column of each double page is not provided with a balance-column on its page; but the space $d$ corresponding to such balance-column and on the reverse side of the initial balance-column on the next succeeding page is left blank. I do not limit myself to leaving the space $d$ blank, as the pages are usually so ruled that the last column of the last day's work (of the double page) terminates a distance from the right-hand edge of the leaf equal to the width of the initial balance-column $c$. Hence it will be noted that the only portion of each page left blank or unoccupied or unruled, as the case may be, is that portion $d$ on the reverse face of the initial balance-column and corresponding thereto in width. However, it might be possible to utilize said space for some purposes in some ledgers within the spirit and scope of my invention.

Each leaf is formed in any suitable manner, so that its margin provided with the initial balance-column $c$ is united to the remainder of the leaf by what might be termed "a double-hinge connection," whereby when said margin is folded to the left there will, through the medium of said double-hinge connection or fold, be formed a pocket beneath said folded-back margin to receive the ends of the leaves intervening between the double page on which the accounts are completed and the new double page to which the balances are to be transferred. Said folding margin is in width equal to or substantially to the initial balance-column $c$, which it carries, and said double hinge or fold connection between said margin and the leaf of which it forms a part can be formed or constituted by the two (or more) parallel creases $e\ e$ or lines or perforations or lines of weakness extending from top to bottom of the leaf. These parallel fold-lines $e\ e$ are arranged close together—say from about one to three or four eighths of an inch apart—according to the size of the book or the number of pages occupied by the full list of accounts. Thus when the accounts have progressed across a double page and the bookkeeper desires to enter up the balances for the last period's work of said page—say double page 1 of the example hereinbefore given—he turns to page 7 and folds the margin thereof to the left on its double fold-lines, and thereby exposes the initial balance-column $c$ on said margin, and then inserts the ends of all of the pages, including the right-hand initial page 1, intervening between said page 1 and said page 7, under said folded-back margin. The portion of said leaf having the folded-back margin between the parallel fold-lines $e\ e$ assumes a vertical position, and thus forms the pocket to receive all of said intervening leaf ends and at the same time permits said folded-back margin to lie flat and horizontally down on the blank end $d$ of the initial page 1, with its initial balance-column $c$ in continuation of the "Saturday-space" of the initial page 1 and its numbered and identified horizontal lines in continuation of the corresponding lines of said initial page, thereby permitting rapid and accurate transferring of the balances to the new double page. After the transfer is completed the intervening pages are turned to the left, the leaf with the folded-back margin is turned to the left, and its said margin turned back to the right, and the new or clean double page is spread out and ready for the accounts to progress across the same. I claim material advantages in locating a name or title column near the right-hand end of the right-hand page, as the book lies open, preferably just to the left of the final period, "Saturday-space" of said page, as hence when the said margin is turned back on said page a name-column is located near said margin and its balance-column and danger of placing the balances in the wrong horizontal spaces is reduced. As before stated, I can also provide additional means to reduce the possibility of error by locating identifying-means for said horizontal spaces near said just-mentioned name-column and also on said initial balance-column, so that during transfer from page to page said row of identifying-numbers along said initial balance-column will be visible, as will also the adjacent row of identifying-numerals along said name-column. Other features of my invention I do not limit to employment in connection with these arrangements just mentioned.

Instead of numbering the pages consecutively throughout the book as usual I can give each page going to make up a double page the same number and number the initial set of double pages from 1 up to the total number required to receive the full list of accounts and then commence over again in numbering the next set of pages required to receive the full list of accounts from 1 up, and so on throughout the book. Hence if six double pages are required to receive the full list of accounts the first six pages will be numbered from 1 to 6, inclusive, the second six pages will be numbered from 1 to 6, and the third six pages will be numbered in the same way. Thus the various sets of accounts will follow double pages of the same identifying-number throughout the book, and the work will be much facilitated thereby as it progesses through the book from corresponding page to corresponding page. I have followed this method of numbering the pages in the drawings, although I do not desire to limit my invention thereto.

It will be understood that in transferring balances from any double page to the corresponding double page at some advanced portion of the book the ends of all intervening pages are inserted in the recess or pocket formed by the turned-back margin and the double fold or crease, and the said margin rests firmly and flatly on the ends of the leaves, so that the bookkeeper can easily write thereon and at the same time hold the various leaves in their proper positions during this operation. The balances can be computed from the last day's work on the completed page and easily transferred to the exposed initial balance-column of the new page which covers the blank space $d$ at the right-hand edge of said completed page and just reaches to the end of the last day's work of said completed page, and thus the progress of the accounts is continuous and uninterrupted.

In books of this class the number of leaves interposed between the leaf transferred from and the leaf transferred to is always the same throughout any given book, as it is determined by the number of pages necessary to record the list of names of accounts. Hence the space between the parallel fold-lines of each folding margin will be the same throughout a given book and the spaces can be made of different widths in different books, according to the number of leaves to be inserted under said margins.

It is obvious that the various features of my invention can be employed in other classes of books than those shown in the drawings or described herein for the purposes of explanation and that the period-spaces can represent other alloted transactions than that for days, as herein illustrated, and that various changes might be made in the arrangements and constructions without departing from the spirit and scope of my invention.

Having thus fully described my invention, what I claim is—

1. An account-book of the character, substantially as described, having leaves provided with margins arranged to fold back, each margin united to its leaf by a double hinge, substantially as described.

2. An account-book, having its leaves formed with parallel separated creases extending vertically throughout the width thereof forming margins adapted to fold back and receive thereunder the ends of the leaves between the page transferred from and the page transferred to, substantially as described.

3. An account-book having several series of accounts, each series occupying a double page and progressing from left to right thereon, the entire series of accounts occupying several consecutive double pages, and being correspondingly duplicated throughout the book, each double page ruled to form working spaces or columns, and having a title-column near the right-hand margin of the right-hand page, each leaf having an end margin creased to fold back and receive thereunder the margins of the intervening pages, substantially as described, each margin having a working column on one side, each page and the working column of its margin formed with horizontal spaces to receive the titles and figures relating thereto, and each such space provided with identifying characters arranged adjacent to said title-column, said working column of each margin correspondingly provided with such identifying characters, whereby when a margin is turned back for transferring, the identifying characters thereof will be disclosed adjacent to the title-column and identifying characters of the page being transferred from, for the purpose stated, substantially as described.

4. An account-book, substantially as described, made up of full-sized leaves and having double pages ruled to receive a set of accounts so that the accounts progress from left to right across the double page, adjacent double pages ruled to receive different sets of accounts, and successive sets of double pages throughout the book formed to receive said sets of accounts, whereby a fixed number of pages intervenes between the pages throughout the book on which the same set of account titles or names is duplicated, each leaf having a margin united thereto by a double hinge so as to fold back and form and constitute a pocket receiving and resting flatly on the margins of all the leaves intervening between the two leaves carrying the same set of account-titles, for the purpose described.

In testimony whereof I affix my signature in presence of two witnesses.

WALTER THOMSON.

Witnesses:
JOHN H. KOREMAN,
J. A. SCHILLING.